(12) United States Patent
Yan

(10) Patent No.: US 9,285,645 B2
(45) Date of Patent: Mar. 15, 2016

(54) DISPLAY PANEL AND DISPLAY APPARATUS

(71) Applicants: BOE TECHNOLOGY GROUP CO., LTD., Beijing (CN); BEIJING BOE DISPLAY TECHNOLOGY CO., LTD., Beijing (CN)

(72) Inventor: Wei Yan, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 14/518,540

(22) Filed: Oct. 20, 2014

(65) Prior Publication Data

US 2015/0370099 A1 Dec. 24, 2015

(30) Foreign Application Priority Data

Jun. 18, 2014 (CN) .......................... 2014 1 0274084

(51) Int. Cl.
*G02F 1/1335* (2006.01)
*G02F 1/137* (2006.01)

(52) U.S. Cl.
CPC .............. *G02F 1/137* (2013.01); *G02F 1/1335* (2013.01); *G02F 1/133528* (2013.01); *G02F 1/133603* (2013.01); *G02F 2001/13356* (2013.01); *G02F 2001/13793* (2013.01); *G02F 2001/133613* (2013.01)

(58) Field of Classification Search
CPC . G02F 1/137; G02F 1/1335; G02F 1/133528; G02F 1/133603; G02F 2001/133613; G02F 2001/13356; G02F 2001/13793
See application file for complete search history.

(56) References Cited

U.S. PATENT DOCUMENTS

| | | | |
|---|---|---|---|
| 2010/0165255 A1* | 7/2010 | Ishitani ............... | H01L 27/1225 349/69 |
| 2011/0234572 A1* | 9/2011 | Toko ....................... | G02F 1/292 345/211 |
| 2013/0016312 A1* | 1/2013 | Kim ........................ | G02F 1/137 349/97 |

* cited by examiner

*Primary Examiner* — Donald Raleigh
(74) *Attorney, Agent, or Firm* — Kinney & Lange, P.A.

(57) ABSTRACT

The present disclosure provides a display panel and a display apparatus. The display panel comprises: a first substrate and a second substrate opposed to each other; a blue phase liquid crystal layer arranged between the two substrates; a first polarizer located on a side of the first substrate away from the blue phase liquid crystal layer; a second polarizer located on a side of the second substrate away from the blue phase liquid crystal layer; a first electrode located on a side of the first substrate facing the blue phase liquid crystal layer; a second electrode located on a side of the second substrate facing the blue phase liquid crystal layer; a first prism layer located between the blue phase liquid crystal layer and the first polarizer; and a second prism layer located between the blue phase liquid crystal layer and the second polarizer.

12 Claims, 2 Drawing Sheets

DISPLAY PANEL AND DISPLAY APPARATUS

CROSS-REFERENCE TO RELATED APPLICATION

This application claims the benefit of Chinese Patent Application No. 201410274084.8 filed on Jun. 18, 2014 in the State Intellectual Property Office of China, the whole disclosure of which is incorporated herein by reference.

BACKGROUND OF THE INVENTION

1. Field of the Invention

The present disclosure relates to a technical field of display, more particularly, relates to a display panel and a display apparatus.

2. Description of the Related Art

The conventional liquid crystal materials achieve the display function on basis of the anisotropic property of the liquid crystal. The light passing through the liquid crystal materials may be controlled by electric control birefringence. However, the discovery of Kerr effect imparts new development of the liquid crystal display materials. Isotropic liquid crystal materials may produce induced refractive index in a direction of electrical field under the effect of the electrical field, and may recover their isotropic property after the electrical power is switched off. Such isotropic liquid crystal materials have great advantages in terms of response time and contrast and become blue in a stable phase, typically called as the blue phase liquid crystal.

The light in the display passes through the liquid crystal cells in a vertical direction. Thus, the birefringence effect will be produced only if the blue phase liquid crystal is extruded transversely. In view of this, all of drivers of the conventional blue phase liquid crystal display apparatus almost employ transverse electrical fields, for example, using In-Plane Switching (IPS) mode, in which the blue phase liquid crystal is driven to be extruded adjacent to the pixel electrodes and common electrodes in the same plane to generate anisotropy. However, in term of the electrical field generated between electrodes in the electrode arrangement, only the horizontal electrical field component parallel to the substrate makes a contribution to the transmissivity of the display panel while the vertical electrical field component will not have any effects on the transmissivity. The horizontal electrical field component becomes relative large in the electrode plane and decreases as the position is raised away from the pixel electrode and the common electrode. In order to ensure sufficient transmissivity of the liquid crystal at the top in an "ON" state, the voltage between two electrodes must be increased to cause an excessive driving voltage.

SUMMARY OF THE INVENTION

The present disclosure provides a display panel and a display apparatus which may reduce the driving voltage of the display panel.

According to an embodiment of the present invention, it provides a display panel comprising: a first substrate and a second substrate opposed to each other; a blue phase liquid crystal layer arranged between the first substrate and the second substrate; a first polarizer located on a side of the first substrate away from the blue phase liquid crystal layer; a second polarizer located on a side of the second substrate away from the blue phase liquid crystal layer; a first electrode located on a side of the first substrate facing the blue phase liquid crystal layer; a second electrode located on a side of the second substrate facing the blue phase liquid crystal layer, the first electrode and the second electrode being configured to generate a vertical electrical field; a first prism layer located between the blue phase liquid crystal layer and the first polarizer and configured to deflect an incident light and direct the deflected incident light towards the blue phase liquid crystal layer; and a second prism layer located between the blue phase liquid crystal layer and the second polarizer and configured to deflect the incident light having passed through the blue phase liquid crystal layer and direct the deflected incident light towards the outside of the display panel.

According to an embodiment of the present invention, it provides a display apparatus comprising a backlight source and a display panel, the display panel comprising: a first substrate and a second substrate opposed to each other; a blue phase liquid crystal layer arranged between the first substrate and the second substrate; a first polarizer located on a side of the first substrate away from the blue phase liquid crystal layer; a second polarizer located on a side of the second substrate away from the blue phase liquid crystal layer; a first electrode located on a side of the first substrate facing the blue phase liquid crystal layer; a second electrode located on a side of the second substrate facing the blue phase liquid crystal layer, the first electrode and the second electrode being configured to generate a vertical electrical field; a first prism layer located between the blue phase liquid crystal layer and the first polarizer and configured to deflect an incident light and direct the deflected incident light towards the blue phase liquid crystal layer; and a second prism layer located between the blue phase liquid crystal layer and the second polarizer and configured to deflect the incident light having passed through the blue phase liquid crystal layer and direct the deflected incident light towards the outside of the display panel.

BRIEF DESCRIPTION OF THE DRAWINGS

The above and other features of the present invention will become more apparent by describing in detail exemplary embodiments thereof with reference to the accompanying drawings. Throughout drawings, same or similar members are indicated by same reference numerals.

DETAILED DESCRIPTION OF PREFERRED EMBODIMENTS OF THE INVENTION

Figure 1:
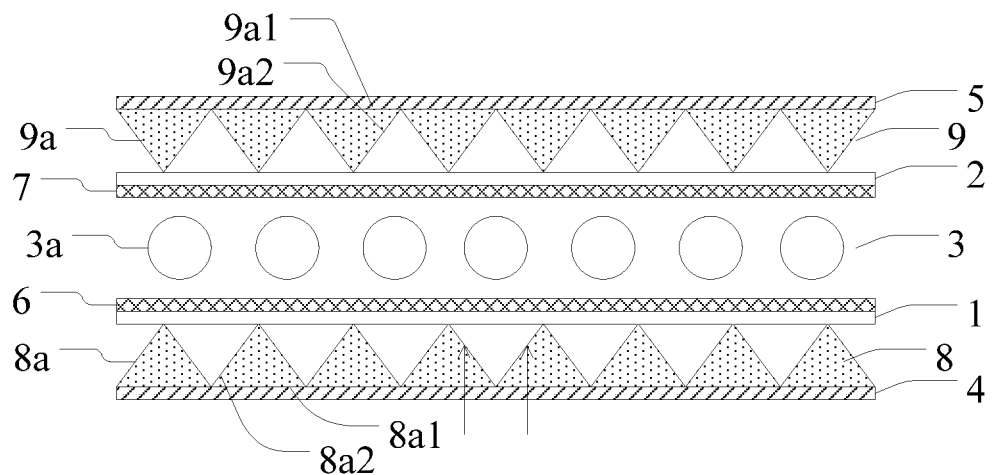
FIG. 1 is a schematic view of a display panel according to an embodiment of the present invention.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

According to a general inventive concept of the present invention, it provides a display panel comprising: a first substrate and a second substrate opposed to each other; a blue phase liquid crystal layer arranged between the first substrate and the second substrate; a first polarizer located on the side of the first substrate away from the blue phase liquid crystal layer; a second polarizer located on the side of the second substrate away from the blue phase liquid crystal layer; a first electrode located on the side of the first substrate facing the blue phase liquid crystal layer; a second electrode located on the side of the second substrate facing the blue phase liquid crystal layer, the first electrode and the second electrode being configured to generate a vertical electrical field; a first prism layer located between the blue phase liquid crystal layer and the first polarizer and configured to deflect an incident light and direct the deflected incident light towards the blue phase liquid crystal layer; and a second prism layer located between the blue phase liquid crystal layer and the second polarizer and configured to deflect the incident light having passed through the blue phase liquid crystal layer and direct it towards the outside of the display panel.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

FIG. 1 shows schematically a display panel according to an embodiment of the present invention. The display panel includes a first substrate 1 and a second substrate 2 opposed to each other; a blue phase liquid crystal layer 3 arranged between the first substrate 1 and the second substrate 2; a first polarizer 4 located on the side of the first substrate 1 facing away from the blue phase liquid crystal layer 3; a second polarizer 5 located on the side of the second substrate 2 facing away from the blue phase liquid crystal layer 3.

The display panel 1 further includes:

a first electrode 6 on the side of the first substrate 1 facing towards the blue phase liquid crystal layer 3 and a second electrode 7 on the side of the second substrate 2 facing towards the blue phase liquid crystal layer 3, the first electrode 6 and the second electrode 7 being configured to generate a vertical electrical field;

a first prism layer 8 located between the blue phase liquid crystal layer 3 and the first polarizer 4 and configured to deflect an incident light and direct the deflected incident light towards the blue phase liquid crystal layer 3; and a second prism layer 9 located between the blue phase liquid crystal layer 3 and the second polarizer 5 and configured to deflect the incident light having passed through the blue phase liquid crystal layer 3 and direct it towards the outside of the display panel 1.

As an example, the vertical electrical field may be an electrical field vertical to the first substrate 1 or the second substrate 2.

In the display panel according to the embodiment of the present invention, as an example, when there is no electrical field between the first electrode 6 and the second electrode 7, the blue phase liquid crystal layer 3 becomes an isotropic medium. In this circumstance, a polarized light having passed through the first polarizer 4 cannot pass through the blue phase liquid crystal layer 3, thus the display panel becomes a dark state. When a voltage is applied between the first electrode 6 and the second electrode 7, an electrical field vertical to the blue phase liquid crystal layer 3 is generated between the first electrode 6 and the second electrode 7 such that the blue phase liquid crystal molecules are extruded under the electrical field, shown in FIG. 2. In this way, the blue phase liquid crystal layer 3 becomes an anisotropic medium, like a single axis crystal with the birefringence property. The anisotropic medium has a refractive index, which increases as the square of the applied electrical field. An incident light perpendicular to the first substrate 1 is transmitted through the first polarizer 4 to form a polarized light and then the polarized light is incident on the first prism layer and deflected. Thereby, its travel direction is changed to be at a certain angle with respect to an optical axis of a blue phase liquid crystal molecule such that the polarization of the polarized light is changed. In this way, the modulation of the liquid crystal molecules to the polarized light may be achieved. In comparison with the control mode with the traverse electrical field in the prior art, the vertical electrical field in the embodiment of the present invention has a relative uniform distribution of intensity at various positions in the blue phase liquid crystal layer, thus, a relative large driving voltage is not necessary. In addition, since the blue phase liquid crystal is initially isotropic without being applied with voltages, the Rubbing process for initial alignment of the liquid crystal may be omitted. In this way, the process may be simplified greatly and the relevant defects caused by the Rubbing process may be avoided.

As an example, the first polarizer 4 has an optical transmission axis perpendicular to that of the second polarizer 5.

As an example, as shown in FIG. 1, the first prism layer 8 may be located between the first substrate 1 and the first polarizer 4 and the second prism layer 9 may be located between the second substrate 2 and the second polarizer 5. For example, the first prism layer 8 and the second prism layer 9 may be formed by a transferring process with PDMS (polydimethylsiloxane), and be adhered and fixed by UV curing adhesives.

As an example, the first prism layer 8 may include a plurality of first triangular prisms 8a and the second prism layer 9 may include a plurality of second triangular prisms 9a.

In an example, the first triangular prisms 8a and the second triangular prisms 9a may be both isosceles triangular prisms.

Figure 2:
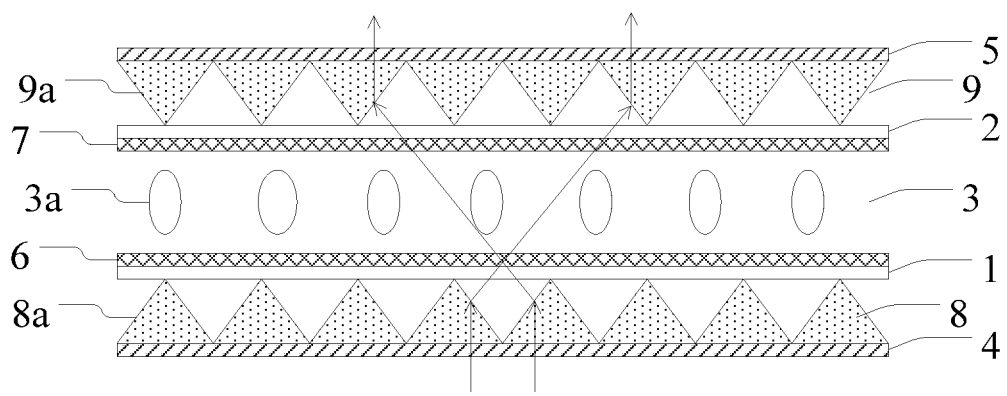
FIG. 2 is a schematic view of the display panel shown in FIG. 1 in electrical field according to an embodiment of the present invention.

With reference to FIGS. 1-2, the first triangular prisms 8a each comprise a bottom face 8a1 which is parallel to the first substrate 1 and two refractive faces 8a2, i.e., two side faces of the isosceles triangular prism, which are inclined at an angle of 30~80 degrees, e.g., 45 degrees, with respect to the bottom face 8a1 of the first triangular prism 8a. As an example, the incident light for the display panel enters the first triangular prisms 8a through the bottom face 8a1 and is then deflected at the refractive faces 8a2 before entering the blue phase liquid crystal layer 3.

As an example, the second triangular prisms 9a each comprise a bottom face 9a1 which is parallel to the second substrate 2 and two refractive faces 9a2, i.e., two side faces of the isosceles triangular prism, which are inclined at an angle of 30~80 degrees, e.g., 45 degrees, with respect to the bottom face 9a1 of the second triangular prisms 9a. As an example, if there is an electrical field between the first electrode 6 and the second electrode 7, the incident light having transmitted through the blue phase liquid crystal layer 3 enters the second triangular prisms 9a through the bottom faces 9a1 and is then deflected at the refractive faces 9a2 such that the light having passed through the second triangular prisms 9a has a travel direction perpendicular to the display panel.

As an example, with reference to FIGS. 1-2, the first triangular prisms 8a have the same size as that of the second triangular prisms 9a and first triangular prisms 8a and the second triangular prisms 9a are opposed to each other one by one, for example, the first triangular prisms 8a and the second triangular prisms 9a may be arranged such that their tops are opposed to each other.

In the display panel according to the embodiment of the present invention, when there is no electrical field between the first electrode 6 and the second electrode 7, the blue phase liquid crystal layer 3 becomes an isotropic medium. In this circumstance, a polarized light formed through the first polarizer 4 cannot pass through the blue phase liquid crystal layer 3, thus the display panel becomes a dark state. As the polarized light nearly cannot pass through the isotropic medium, the effects of the dark state in this case would be significantly better than that of the conventional liquid crystal materials (the dark state of the conventional liquid crystal materials may still produce minor light leakage due to the difference between the liquid crystal orientation and the light polarization direction, which may cause an undesired dark state). Since the dark state is a critical factor for contrast, the blue phase liquid crystal layer 3 has a contrast significantly over the conventional liquid materials.

When an electrical field is applied between the first electrode 6 and the second electrode 7, the blue phase liquid crystal molecules are converted into an optically single axis crystal. Its optical axis is parallel to the electrical field direction and the isotropic property of the optically single axis crystal becomes the anisotropic property so as to present the property of conventional liquid crystal materials. The incident light vertical to the first substrate 1 passes through the first polarizer 4 to form a polarized light and the polarized light enters the first prism layer 8. Due to refractive effects of the triangular prisms, the direction of the light incident on the blue phase liquid crystal molecules become at a certain angle with respect to the optical axis of the blue phase liquid crystal such that the polarized light transmitted through the blue phase liquid crystal molecules has a varied polarization, thereby achieving the modulation of the liquid crystal molecules to the polarized light. In this way, the modulated polarized light can pass through the second polarizer. Further, by means of the second prism layer, the travel direction of the incident light transmitted through the blue phase liquid crystal layer may be changed before it passes through the second polarizer such that the light exiting the display panel has the travel direction perpendicular to the display panel. As an example, the angle of the direction of the light incident on the blue phase liquid crystal molecules with respect to the optical axis of the blue phase liquid crystal may be determined by the angle of the refractive faces 8a2 of the first prism 8a with respect to the bottom face 8a1 of the first prism 8a.

Figure 3:
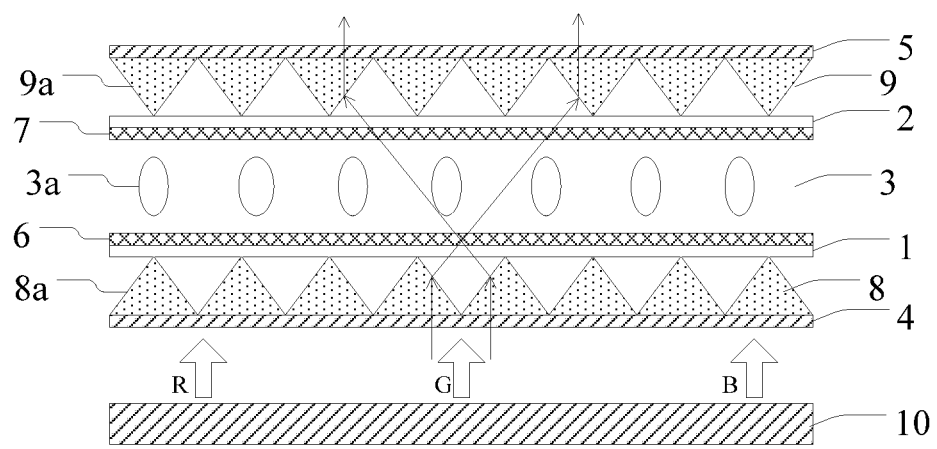
FIG. 3 is a schematic view of a display apparatus according to an embodiment of the present invention.

In addition, as illustrated in FIG. 3, an embodiment of the present invention also provides a display apparatus including a backlight source 10 and a display panel as described in any of the above embodiments.

As an example, the above backlight source 10 may be a R(red)G(green)B(blue)-LED field sequential backlight source. As the blue phase liquid crystal layer 3 has a very high response speed in level of sub-millisecond. By mean of this property, the RGB three color backlight sources may be combined to achieve color display. Thus, colored RGB filters and white LEDs will not be needed any longer, but it only needs to start the RGB three color LED backlight source in different orders so as to achieve the color display, in combination with retentivity of vision of human eyes. Since the colored filters can be omitted, the transmittivity of the display panel and the utilization ratio of the backlight source may be improved more efficiently.

Figure 4:
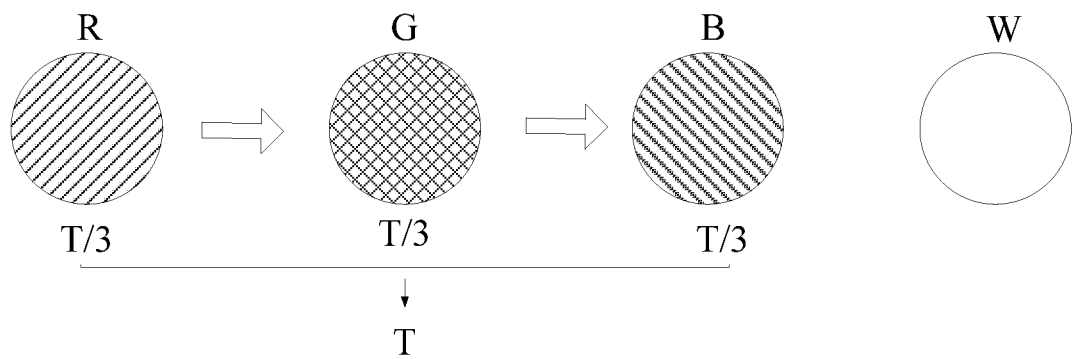
FIG. 4 is a schematic view showing a field sequential display according to an embodiment of the present invention.

In particular, as long as the period in which the RGB colors are repeated sequentially is less than the retentivity time of vision of human eyes, a colored image may be formed in the brain of the human being. The retentivity time of vision is in fact the display period T of one frame picture, for example, typically 1/60 second, i.e., 60 Hz. It will need the display for red, green, blue three images must be done within 1/60 second. Thus, the display for each color must be achieved within 1/180 second. As an example, a white circle pattern W is given at the rightmost side in FIG. 4. The white circle pattern W may be formed by superposing the red, green and blue circle patterns shown in the left side of FIG. 4. For example, if it is intended to display the white circle pattern W shown in FIG. 4, the RGB three color LEDs need to be switched on sequentially for T/3 second, i.e., the circle pattern is illuminated by RGB three color LED backlight source for T/3 second respectively. However, due to the retentivity of vision, the eyes of human being will appear to see the three colors simultaneously, and the practical synthesized final color will be white. Thus, the above means may be called as a regime of "field sequence" or "color sequence". If different gray scales of colors are needed, the switch order of thin film transistors (TFT) of these pixels may be controlled while the backlight source is controlled, such that the liquid crystal light valve can be switched on correspondingly by the intensity that the pixel should have with such color so as to achieve display with different gray scales.

As an example, the display apparatus according to an embodiment of the present invention may be any products or components having display function, such as a display screen of a notebook, a liquid crystal display, a liquid crystal TV, a digital photo frame, a cell phone, a tablet computer or the like.

The display apparatus according to an embodiment of the present invention needs a relatively large driving voltage. In addition, in combination with the RGB-LED backlight source, a field sequential color display may be achieved without colored filters, which may simplify the process greatly.

Although several exemplary embodiments have been shown and described, the present invention is not limited to those and it would be appreciated by those skilled in the art that various changes or modifications may be made in these embodiments without departing from the principles and spirit of the disclosure, the scope of which is defined in the claims and their equivalents.

What is claimed is:
1. A display panel, comprising:
a first substrate and a second substrate opposed to each other;
a blue phase liquid crystal layer arranged between the first substrate and the second substrate;
a first polarizer located on a side of the first substrate away from the blue phase liquid crystal layer;
a second polarizer located on a side of the second substrate away from the blue phase liquid crystal layer;
a first electrode located on a side of the first substrate facing the blue phase liquid crystal layer;
a second electrode located on a side of the second substrate facing the blue phase liquid crystal layer, the first electrode and the second electrode being configured to generate a vertical electrical field;
a first prism layer located between the blue phase liquid crystal layer and the first polarizer and configured to deflect an incident light and direct the deflected incident light towards the blue phase liquid crystal layer; and
a second prism layer located between the blue phase liquid crystal layer and the second polarizer and configured to deflect the incident light having passed through the blue phase liquid crystal layer and direct the deflected incident light towards the outside of the display panel;
wherein the first prism layer comprises a plurality of first triangular prisms and the second prism layer comprises a plurality of second triangular prisms and both the first triangular prisms and the second triangular prisms are isosceles triangular prisms;

wherein the first triangular prisms each comprise a bottom face which is parallel to the first substrate and two refractive faces which are inclined at an angle of 30~80 degrees with respect to the bottom face thereof; and/or the second triangular prisms each comprise a bottom face which is parallel to the second substrate and two refractive faces which are inclined at an angle of 30~80 degrees with respect to the bottom face of the second triangular prism; and wherein the first triangular prisms have the same size as that of the second triangular prisms, and the first triangular prisms and the second triangular prisms are arranged such that their tops are opposed to each other.

2. The display panel according to claim 1, wherein, in each first triangular prism, the refractive faces are inclined at an angle of 45 degrees with respect to the bottom face; and/or wherein, in each second triangular prism, the refractive faces are inclined at an angle of 45 degrees with respect to the bottom face.

3. The display panel according to claim 1, wherein the first prism layer is located between the first substrate and the first polarizer, and the second prism layer is located between the second substrate and the second polarizer.

4. The display panel according to claim 3, wherein the first prism layer comprises a plurality of first triangular prisms, and the second prism layer comprises a plurality of second triangular prisms.

5. The display panel according to claim 4, wherein both the first triangular prisms and the second triangular prisms are isosceles triangular prisms.

6. A display panel, comprising:
a first substrate and a second substrate opposed to each other;
a blue phase liquid crystal layer arranged between the first substrate and the second substrate;
a first polarizer located on a side of the first substrate away from the blue phase liquid crystal layer;
a second polarizer located on a side of the second substrate away from the blue phase liquid crystal layer;
a first electrode located on a side of the first substrate facing the blue phase liquid crystal layer;
a second electrode loaded on a side of the second substrate facing the blue phase liquid crystal layer, the first electrode and the second electrode being configured to generate a vertical electrical field;
a first prism layer located between the blue phase liquid crystal layer and the first polarizer and configured to deflect an incident light and direct the deflected incident light towards the blue phase liquid crystal layer; and
a second prism layer located between the blue phase liquid crystal layer and the second polarizer and configured to deflect the incident light having passed through the blue phase liquid crystal layer and direct the deflected incident light towards the outside of the display panel;
wherein the first prism layer is located between the first substrate and the first polarizer, and the second prism layer is located between the second substrate and the second polarizer;
wherein the first prism layer comprises a plurality of first triangular prisms, and the second prism layer comprises a plurality of second triangular prisms;
wherein both the first triangular prisms and the second triangular prisms are isosceles triangular prisms; and
wherein the bottom faces of the first triangular prisms face towards the first polarizer and the bottom faces of the second triangular prisms face towards the second polarizer.

7. The display panel according to claim 5, wherein the first triangular prisms each comprise a bottom face which is parallel to the first substrate and two refractive faces which are inclined at an angle of 30~80 degrees with respect to the bottom face thereof; and/or wherein the second triangular prisms each comprise a bottom face which is parallel to the second substrate and two refractive faces which are inclined at an angle of 30~80 degrees with respect to the bottom face of the second triangular prism.

8. The display panel according to claim 1, wherein the first polarizer has an optical transmission axis perpendicular to that of the second polarizer.

9. A display apparatus, comprising a backlight source and a display panel, the display panel comprising:
a first substrate and a second substrate opposed to each other;
a blue phase liquid crystal layer arranged between the first substrate and the second substrate;
a first polarizer located on a side of the first substrate away from the blue phase liquid crystal layer;
a second polarizer located on a side of the second substrate away from the blue phase liquid crystal layer;
a first electrode located on a side of the first substrate facing the blue phase liquid crystal layer;
a second electrode located on a side of the second substrate facing the blue phase liquid crystal layer, the first electrode and the second electrode being configured to generate a vertical electrical field;
a first prism layer located between the blue phase liquid crystal layer and the first polarizer and configured to deflect an incident light and direct the deflected incident light towards the blue phase liquid crystal layer; and
a second prism layer located between the blue phase liquid crystal layer and the second polarizer and configured to deflect the incident light having passed through the blue phase liquid crystal layer and direct the deflected incident light towards the outside of the display panel;
wherein the first prism layer comprises a plurality of first triangular prisms, and the second prism layer comprises a plurality of second triangular prisms;
wherein both the first triangular prisms and the second triangular prisms are isosceles triangular prisms;
wherein the first triangular prisms each comprise a bottom face which is parallel to the first substrate and two refractive faces which are inclined at an angle of 30~80 degrees with respect to the bottom face thereof; and/or wherein the second triangular prisms each comprise a bottom face which is parallel to the second substrate and two refractive faces which are inclined at an angle of 30~80 degrees with respect to the bottom face of the second triangular prism; and
wherein the first triangular prisms have the same size as that of the second triangular prisms, and the first triangular prisms and the second triangular prisms are arranged such that their tops are opposed to each other.

10. The display apparatus according to claim 9, wherein the first prism layer is located between the first substrate and the first polarizer, and the second prism layer is located between the second substrate and the second polarizer.

11. The display apparatus according to claim 9, wherein the first polarizer has an optical transmission axis perpendicular to that of the second polarizer.

12. The display apparatus according to claim 9, wherein the backlight source is a RGB-LED field sequential backlight source.

\* \* \* \* \*